Nov. 24, 1970   R. A. RAVENEL   3,541,879
GEAR SELECTOR LOCKING MEANS
Filed June 13, 1968   3 Sheets-Sheet 2

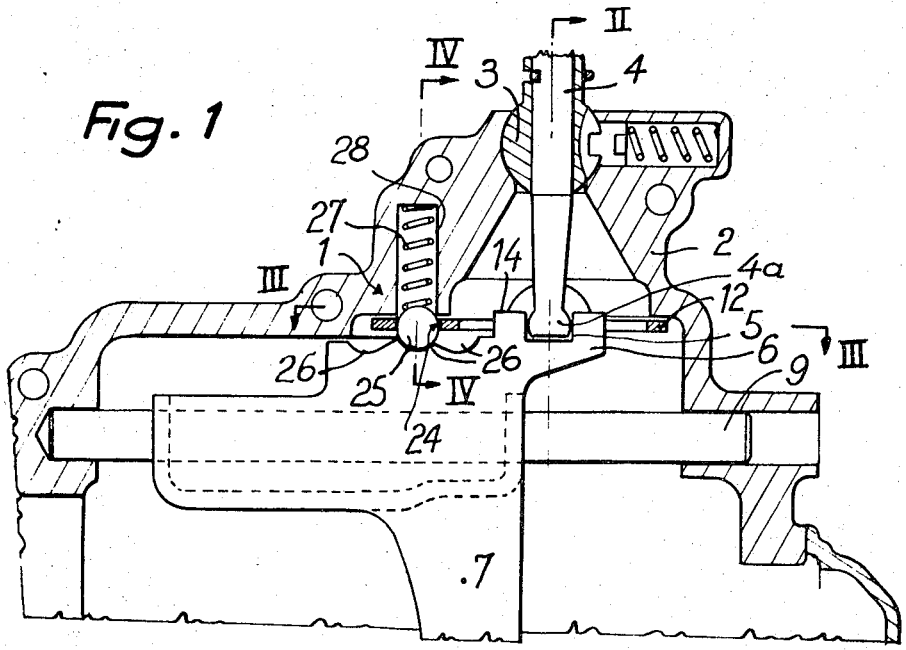
Fig. 1
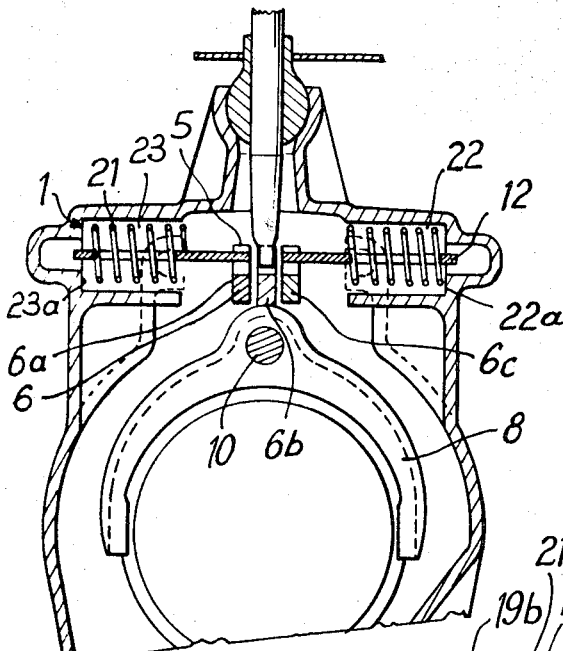
Fig. 2
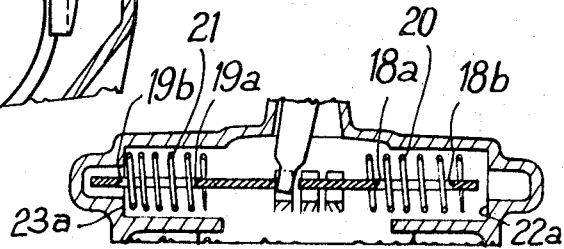
Fig. 2 bis

United States Patent Office 3,541,879
Patented Nov. 24, 1970

3,541,879
GEAR SELECTOR LOCKING MEANS
Raymond A. Ravenel, Sceaux, France, assignor to Societe Anonyme Andre Citroen, Paris, France, a French society
Filed June 13, 1968, Ser. No. 736,711
Claims priority, application France, June 15, 1967, 110,502
Int. Cl. G05g 5/10
U.S. Cl. 74—477　　　　　　　　　　　　　　　3 Claims

ABSTRACT OF THE DISCLOSURE

A gear box selector locking element comprising a thin plate with two springs mounted therein. The plate being movable transversely of the selector and having central opening through which an end of the gear change lever passes. Each spring normally bearing against a face and a part of the plate and arranged to abut the gear box housing when the plate is moved out of its neutral position.

---

This invention relates to a device having the combined functions of locking the selector gear moving elements in a gear box and of returning the gear change lever to its neutral position.

In the known devices at present in use, there is an individual locking mechanism for each selector gear moving element in each of its positions and a mutual locking mechanism for these elements which prevents movement of one of them if the others do not occupy their respective neutral positions. These locking mechanisms are separate and spaced apart, often being located at either end of the gear box housing. They are essentially constituted by balls acted on by springs or displaced from one recess to another by the relative movement of the selector gear moving elements.

A method of locking the selector gear moving elements in the neutral position is also known, in which the lower end of the gear change lever engages in grooves, provided for this purpose in the selector gear moving elements, so as to cause them to slide longitudinally, the end of said lever passing through a transversely movably mounted element. This element is a pivoted quadrant which enables the end of the lever to swing backwards and forwards in the direction in which the selector gear moving elements slide. In the transverse direction, the movement of the end of the lever leaving a groove of one of the selector gear moving elements and entering the groove of an adjacent element causes the quadrant to pivot. The quadrant has projections which also engage in the grooves of the selector gear moving elements, with the exception of that in which is engaged the gear change lever.

One of the main disadvantages of locking by means of a pivoted quadrant is the considerable size of the quadrant. A disadvantage of locking by means of balls, often associated with springs, is the large number of separate pieces of small dimensions, the assembly of which is often long and tedious.

Moreover, in addition to the locking devices described above, two return springs are frequently used located transversely to the direction of sliding of the selector gear moving elements, and to either side of the gear change lever. These return springs bear, on the one hand against the lever, and on the other hand against a wall of the housing. They ensure the automatic return of the lever to the central neutral position, after the disengagement of a pair of gears in the gear box. This automatic return means for the gear change lever is mounted in the gear box independently of the locking devices.

A main object of the invention is to provide particular improvements to the locking devices for the selector gear moving elements in a gear box, as well as to the means for returning the gear change lever to its neutral position. All the presently known results are obtained by means of the invention using a considerably smaller number of components, the combined size of which is small. The manufacture and assembly of the components used are simpler and lead to a reduction in the net cost. As will be better understood hereafter, this results from a combination of the locking devices with the means for returning the gear lever to its neutral position.

According to the invention, the part which is movably mounted transversely to the selector gear moving elements is a thin plate sliding in its plane and having two spaced faces, each acting as an abutment for one end of a corresponding transverse return spring, the other ends of the springs bearing against the gear box housing.

The plate has a central opening surrounding a raised zone of the selector gear moving elements in which the grooves are formed, the projections adapted to cooperate with these grooves extending towards one another within this opening from opposite lateral edges of the latter. The space separating the free ends of the projections is at least equal to the thickness in the transverse direction of one of the selector gear moving elements and the end of the gear change lever is situated in this space.

The plate has a second opening located beside the central opening along the axis, parallel to the movement of the selector gear moving elements, of the space separating the projections. A ball, movable with the plate is housed in this second opening and is partially engaged in one of the serially disposed locking notches in that selector gear moving element which is not cooperating with the projections of the plate and is pushed back in the direction of this notch by a resilient device which also bears against the gear box housing.

The invention will be better understood from the following description, given solely by way of example and from which will appear the subsidiary characteristics as well as the advantages of the invention. Reference will be made to the accompanying drawings, in which:

FIG. 1 is a side elevation in vertical section of part of a gear box having the device of the invention;

FIG. 2 is a sectional view along the line II—II of FIG. 1;

Figure 3:
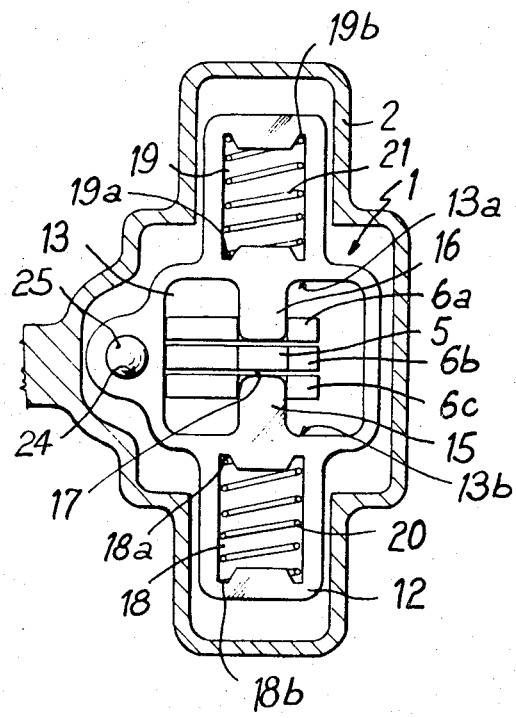
Figure 4:
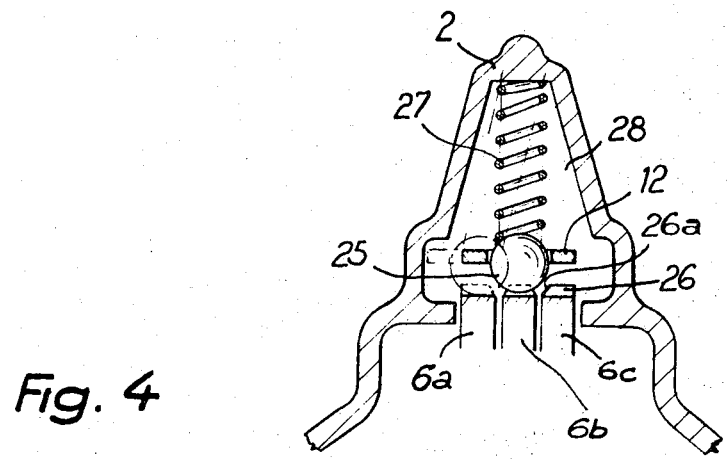

FIG. 2 bis is a partial view similar to FIG. 2 showing another position of the gear lever;

FIG. 3 is a plan view in section along the line III—III of FIG. 1;

FIG. 4 is a partial view in section along the line IV—IV of FIG. 1; and

Figure 5:
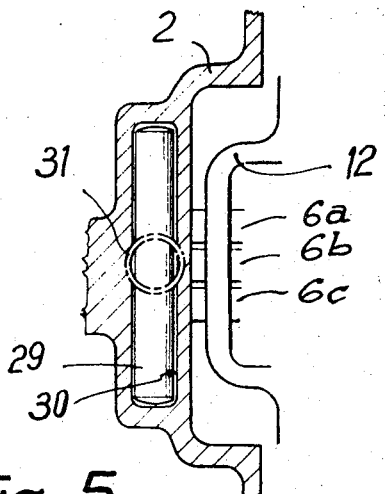
Figure 6:
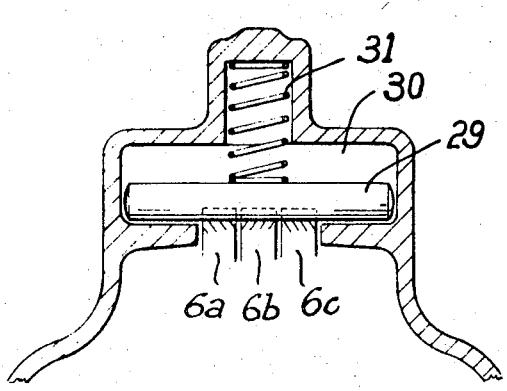

FIG. 5 and FIG. 6 are views similar respectively to FIG. 3 and FIG. 4 showing an alternative embodiment.

FIG. 1 shows diagrammatically part of a gear box (for example of a motor vehicle) having a mechanism designated by the general reference 1 and having the combined function of locking and returning to neutral in accordance with the invention.

There will be set out first the known components with which the device 1 is associated.

A gear change lever 4 is pivotally mounted by means of a swivel joint 3 on the upper part of the gear box housing 2. The lower end 4a of the lever is adapted to be selectively engaged in the grooves 5 formed in the selector gear moving elements 6.

In this example, three elements 6a, 6b, 6c disposed parallel to one another and each rigid with a fork such as that shown at 7 (FIG. 1) or at 8 (FIG. 2). In these drawings, only a single fork has been shown for the sake of clarity. Each fork is movable in known manner with its respective moving element along a corresponding axis 9 (FIG. 1) or 10 (FIG. 2), and during the sliding of a fork a selector gear is brought into engagement with an adjacent gear or brought back in the reverse direction to its neutral position.

The device 1 of the invention comprises a relatively thin plate 12 preferably cut from sheet metal. It is mounted to slide in its plane and held by springs 20, 21, to which reference will be made hereafter, the springs themselves being guided in recesses 22, 23 in the housing 2. The plate is movable in a direction transverse to the movement of the selector gear moving elements 6.

The plate 12 has a first central opening 13 which surrounds a raised zone 14 (see FIG. 1) of the elements 6, in which the grooves 5 are formed. Two projections 15, 16 are formed inside the central opening 13 and are adapted to cooperate with the grooves 5 which extend towards one another from opposite lateral edges 13a, 13b of the opening as shown in FIG. 3.

A space 17 separates the free ends of the projections 15, 16, being at least equal to and preferably slightly larger than the width in the transverse direction of the elements 6, as shown in FIG. 3. The free end 4a of the lever 4 is located in the space 17 and engaged in one of the grooves 5.

In the neutral position of the lever 4, the grooves 5 of the selector gear moving elements are in alignment, the end 4a being in the groove of the central element 6b, and the projections 15, 16 being engaged respectively in the grooves of the adjacent elements 6c, 6a.

Holes 18, 19 are cut in the plate 12 between the central opening and the outer edges of the plate and in alignment with the projections 15, 16. In each hole is housed a helicoidal compression spring 20, 21 precompressed between the faces 18a, 19a adjacent the projections and the opposite faces 18b, 19b. The ends of the springs bearing against these latter faces are located in the immediate vicinity of the inner ends 22a, 23a of cavities 22, 23 in the housing, and contact the housing when the plate is moved in the appropriate direction (FIG. 2 bis). The plate thus tends to be brought into its median position, together with the lever 4 disposed between the projections 15 and 16.

The plate 12 has a second opening 24 of circular shape located beside the central opening 13 and on the longitudinal axis of the space 17.

When, as in FIG. 3, there are three selector gear moving elements, the opening 24 is, for the neutral position, on the axis of the central element 6b. A ball 25 is held in the opening 24 and moves transversely with the plate 12. It is partially engaged in one of three locking notches 26 formed in serial disposition in each of the elements 6. As will be seen from FIG. 4, chamfers 26a facilitate the passage in the transverse direction of the ball 25 from one notch 26 in one of the selector gear moving elements to an adjacent notch in another such element.

The ball 25 is urged into the holes 26 by a helicoidal spring 27 which bears at its other end against the housing 2. This spring 27 is housed in a recess 28 visible in FIGS. 1 and 4 and which, as can be seen from FIG. 4, has a trapezoidal section which is wider towards the ball 25 in a sectional plane parallel to the direction of movement of the plate 12. As the plate slides, the spring 27 is deformed as is represented in broken lines in FIG. 4, but continues to act on the ball 25.

The device of the invention operates as follows:

When the lever 4 is moved transversely for example, thus compressing the spring 21 (FIG. 2 bis), its end 4a engages in the grove 5 of a lateral selector gear moving element, for example 6a. The projection 16 is pushed out of the groove of this same element, while the projection 15 engages at the same time in the grooves 5 of the two other elements 6b, 6c and locks them together. Mutual locking is thus obtained.

As the plate 12 slides, the ball 25 has left the central locking notch 26 of the central element 6b to engage in the central locking notch 26 of the lateral element 6a, and the later is thus locked.

If the lever 4 is released at this moment, the spring 21, acting as a return spring on the plate 12, moves it back into its neutral position.

If on the contrary, the lever 4 is moved in one of the directions of sliding of the selector gear moving elements without being released, a gear ratio is engaged in the gear box. The element 6a which has been moved acts as an abutment for the projection 16, preventing the plate 12 from returning to its median position, the other projection 15 of the plate introduced into the grooves 5 of the elements 6b and 6c effecting locking of the latter. As the elements 6a slides, the ball 25 leaves the median locking notch 26 and enters one of the outer notches 26, so as to ensure locking in the longitudinal direction of the corresponding fork.

The reverse operation is performed to bring the lever 4 back into its neutral position.

It will be observed that the combined functions of locking and returning to neutral are effected by means of only five small components, housed partially one within the other, such as the springs 20, 21 and the ball 25 in the plate 12. The manufacturing and assembly costs are clearly reduced in comparison with known techniques.

It is clear that different modifications can be made to the shapes of the components and to their relative disposition. Thus the invention is not limited to the embodiment described and shown, but covers all modifications thereto or equivalents thereof which do not depart from the scope of the invention.

There is shown in particular in FIGS. 5 and 6 a variant of the means for longitudinally locking the fork moving elements 6. In this case, the ball 25 is in effect replaced by a roller 29 extending transversely over at least the width occupied by the three elements 6a, 6b, 6c. This roller moves within the housing 30 similar to the housing 28 of the ball and is subjected to the action of a spring 31 maintaining it in engagement with the locking notches 26. The operation is practically identical to that described above, displacement of the roller in its housing permitting its movement from a locking notch 26 in one element to an adjacent notch in the same element.

What is claimed is:

1. In a gear box the combination comprising a housing, a plurality of shift elements mounted for slidable movement in one direction in said housing, each of said shift elements having means defining a groove, a gear change lever pivotally mounted on said housing for selectively engaging each of said grooves in said shift elements to shift the latter, a plate element in said housing movable transversely of said one direction by said gear change lever and having a central opening generally disposed in front of said grooves through which opening said gear change lever passes, said plate element having two projections extending into said central opening towards each other from opposite lateral edges thereof to engage said grooves in said shift elements, said two projections having free ends spaced from one another a distance equal to at least the thickness, in a transverse direction of that part of the gear shift lever which passes through said central opening, said projections selectively engaging said grooves in said shift elements as said plate element is moved transversely, whereby the shift elements engaged by said projections are locked against slidable movement while the shift element engaged by said gear change lever is free for slidable shifting movement, said combination further comprising biasing means in said housing normally biasing said plate element in a median position, said biasing means comprising a pair of springs each of which is mounted within a hole in said plate element and each of which has its axis generally aligned with the center line of said projections on said plate element, each spring bearing at one end against the face of the hole nearest to the corresponding projection and at its other end against the opposite face of the hole when said plate element is in its median position.

2. In a gear box, the combination comprising a housing, a plurality of shift elements mounted for slidable movement in one direction in said housing, each of said shift elements having means defining a groove, a gear change lever pivotally mounted on said housing for selectively engaging each of said grooves in said shift elements to shift the latter, a plate element in said housing having a central opening through which said gear change lever passes, said plate element having projection means adapted to engage said grooves in said shift elements, said plate element being movable transversely of said one direction by said gear change lever as the latter is moved to selectively engage a groove in said shift elements, and biasing means in said housing normally biasing said plate element in a median position, said projection means selectively engaging said grooves in said shift elements as said plate element is moved transversely, whereby the shift elements engaged by said projection means are locked against slidable movement while the shift element engaged by said gear change lever is free for slidable shifting movement, said plate element having a second opening, a ball housed in said second opening and movable with said plate element, each of said shift elements having a plurality of serially disposed locking notches, said ball being adapted to be partially engaged in one of said plurality of notches, said engagement being effected in the notches of the shift element which is engaged by said gear change lever, and a resilient member having one end bearing against the gear box housing and urging said ball in the direction of said notches.

3. In a gear box according to claim 2 wherein said resilient member comprises a spring disposed in a recess in said gear box housing having a trapezoidal configuration considered in a plane parallel to the direction of movement of said element.

References Cited

UNITED STATES PATENTS

| 1,389,287 | 8/1921 | Asprooth | 74—477 |
| 2,435,929 | 2/1948 | Plexico | 74—477 X |
| 2,684,600 | 7/1954 | Naumann | 74—477 |
| 2,690,684 | 10/1954 | Stemler | 74—477 |

MILTON KAUFMAN, Primary Examiner